US009097292B2

(12) United States Patent
Kang

(10) Patent No.: US 9,097,292 B2
(45) Date of Patent: Aug. 4, 2015

(54) DRY DOUBLE CLUTCH

(75) Inventor: Seok Min Kang, Daegu (KR)

(73) Assignee: Pyong Hwa Valeo Co., Ltd. (KR)

( * ) Notice: Subject to any disclaimer, the term of this patent is extended or adjusted under 35 U.S.C. 154(b) by 0 days.

(21) Appl. No.: 14/239,183

(22) PCT Filed: Aug. 18, 2011

(86) PCT No.: PCT/KR2011/006070
§ 371 (c)(1),
(2), (4) Date: Mar. 20, 2014

(87) PCT Pub. No.: WO2013/024923
PCT Pub. Date: Feb. 21, 2013

(65) Prior Publication Data
US 2015/0068860 A1    Mar. 12, 2015

(51) Int. Cl.
| | |
|---|---|
| *F16D 21/06* | (2006.01) |
| *F16F 15/315* | (2006.01) |
| *F16D 13/64* | (2006.01) |
| *F16D 13/68* | (2006.01) |
| *F16F 15/30* | (2006.01) |

(52) U.S. Cl.
CPC .............. *F16D 21/06* (2013.01); *F16D 13/646* (2013.01); *F16D 13/68* (2013.01); *F16F 15/30* (2013.01);
(Continued)

(58) Field of Classification Search
CPC ............ F16D 21/06; F16D 2021/0607; F16D 2021/0615; F16D 2021/0684; F16D 13/646; F16D 13/68; F16D 25/10; F16F 15/131; F16F 15/30; F16F 15/315; Y02T 10/76
See application file for complete search history.

(56) References Cited

U.S. PATENT DOCUMENTS

| 7,249,665 B2 | 7/2007 | Heinrich et al. |
| 7,686,147 B2 | 3/2010 | Friedmann et al. |

(Continued)

FOREIGN PATENT DOCUMENTS

| JP | 2005-241000 A | 9/2005 |
| KR | 10-2006-0050952 A | 5/2006 |

(Continued)

OTHER PUBLICATIONS

International Search Report (in Korean with English translation) for PCT/KR2011/006070, mailed Apr. 24, 2012; ISA/KR.

*Primary Examiner* — Jacob S Scott
(74) *Attorney, Agent, or Firm* — Harness, Dickey & Pierce, P.L.C.

(57) ABSTRACT

The present invention relates to a dry double clutch. A damper flywheel (300) comprises: a connector (600) coupled to a drive plate (320) of the damper flywheel (300); a cover (700) compensating for backlash between the connecting plate (400) and the connector (600); and a first resilient member (616) resiliently pressing the cover (700) in the circumferential direction of the connector (600). A first clutch disk (250) of the set double clutch (200) is characterized by having an assembled structure consisting of: a stopper ring (271) enclosing a boundary portion (256) between the first clutch disk (250) and a first hub (255); a retainer ring (273) coupled opposite the stopper ring (271) and having the first clutch disk (250) interposed therebetween, and enclosing the boundary portion (256); and a resilient washer (275) resiliently supporting the first hub (255). Accordingly, a cover can be mounted on the connector, which transmits power from the damper flywheel, which is connected to the engine, to the set double clutch connected to the transmission so as to compensate for backlash in the connector, and vibrations in an axial direction transmitted from the first hub to the stopper ring during shifting can be absorbed by the stopper ring and the resilient washer interposed between and a first drive plate and the first hub, in order to prevent loss of durability of the stopper ring.

17 Claims, 12 Drawing Sheets

(52) U.S. Cl.
  CPC ....... *F16F 15/315* (2013.01); *F16D 2021/0615* (2013.01); *F16D 2021/0684* (2013.01); *Y02T 10/76* (2013.01)

(56) References Cited

U.S. PATENT DOCUMENTS 7,967,122 B2   6/2011   Friedmann et al.
2005/0189195 A1   9/2005   Heinrich et al.
2006/0289263 A1   12/2006   Friedmann et al.
2008/0230342 A1   9/2008   Friedmann et al.
2011/0120831 A1   5/2011   Thibaut et al.
2011/0233021 A1   9/2011   Friedmann et al.

FOREIGN PATENT DOCUMENTS

KR   10-2011-0069687 A   6/2011
WO   WO-2009-122096 A2   10/2009

DRY DOUBLE CLUTCH

CROSS-REFERENCE TO RELATED APPLICATIONS

This application is a 371 U.S. National Stage of International Application No. PCT/KR/2011/006070, filed on Aug. 18, 2011, the disclosure of which is herein incorporated by reference in its entirety.

TECHNICAL FIELD

The present invention relates to a dry double clutch, and more particularly, to a dry double clutch capable of compensating for backlash in a connector for transmitting power from a damper flywheel, which is connected to an engine side, to a set double clutch, which is connected to a transmission side, in order to enhance shock-absorbing performance in an axial direction of a clutch disc involved in power control and assembly thereof.

BACKGROUND ART

The present invention relates to a double clutch for a transmission having two input shafts which are coaxially arranged. Since a transmission having one input shaft is used in the related art, one clutch disc is also used to transmit power from an engine to the transmission or block the same. However, a double clutch transmission having two shafts is required to use a double clutch having two clutch discs so as to transmit power from the engine. Such a double clutch needs two clutches, is configured of a dual operation gear type, and allows a double shaft to be changed whenever the double clutch is shifted one at a time, thereby enabling shift speed to be high and helping in improving actual fuel efficiency.

In particular, a dry double clutch transmits power of an engine to a transmission by friction between a clutch disc and a pressure plate without use of oil, unlike a conventional wet double clutch. Such a dry double clutch, particularly a dry double clutch designated by reference numeral 101 in FIG. 1, transmits power of an engine to a transmission by friction between a clutch disc and a pressure plate without use of oil, unlike a conventional wet double clutch. Such a dry double clutch designated by reference numeral 101 in FIG. 1 is divided into a set double clutch 102 and a damper flywheel 103.

Among of them, the set double clutch 102 has a central plate 105 coupled to a connection plate 107 by connection rivets 108, and the central plate 105 enables a first pressure plate 109 and a second pressure plate 111 to rotate by pressing first and second clutch discs 113 and 115. The first clutch disc 113 is located to an engine side of the central plate 105 through a first hub 117, and the first hub 117 is coupled to a transmission inner input shaft 119. The second clutch disc 115 is located to a transmission side of the central plate 105 through a second hub 121, and the second hub 121 is coupled to a transmission outer input shaft.

In this case, the first clutch disc 113 is configured such that a first drive plate 123 is coupled to the first hub 117 by an assembly structure consisting of a stopper ring 125, a retainer ring 127, and a snap ring 129, as shown in FIG. 2. As shown in FIG. 1, the stopper ring 125 and the retainer ring 127 are respectively pressed against inner and outer sides of the first drive plate 123 by rivets 131 passing through the first drive plate 123 so as to prevent the first hub 117 from being decoupled from the first drive plate 123.

In addition, the damper flywheel 103 includes a primary wheel 110 which is coupled to a crankshaft of an engine by bolts, a primary cover 130 which covers an upper portion of the primary wheel 110, a drive plate 120 which transmits power of the engine inside the primary wheel 110 and the primary cover 130, and the like. In addition, the power of the engine is transmitted from the damper flywheel 103 to the set double clutch 102 by a spline type connector 130, and a spline gear is formed on an outer peripheral surface of the connector 130. In addition, the set double clutch 102, to which the power is transmitted by engaging with the spline gear, is configured such that the connection plate 107 spline-coupled with the connector 130 is coupled to the set double clutch 102. In this case, the connection plate 107 has a circular shape formed at a center thereof with a hole, and includes an extension portion is radially coupled to the set double clutch 102. The hole has a hub structure, and forms a spline gear corresponding to the connector 130. Accordingly, the damper flywheel 103 and the set double clutch 102 transmit the power by means of spline coupling between the connector 130 and the connection plate 107.

However, in a case of spline coupling, backlash may be generated due to tolerance between teeth of a gear and teeth of another gear, and thus impact is applied to the teeth of the gears during rotation of the gears in a clockwise or counterclockwise direction. Particularly, in power transmission of a vehicle, the damper flywheel and the set double clutch rotate relative to each other in the clockwise or counterclockwise direction during acceleration and deceleration of the vehicle. In this case, the backlash causes impact and noise in the connector and the connection plate, deterioration of damping performance in the rotation direction, and reduction in durability of the vehicle. Furthermore, since the impact and noise are transferred to a driver during driving of the vehicle, there is a problem in that it may also be uncomfortable to ride in.

In addition, since the stopper ring 125 supporting the first hub 117 comes into direct contact with the first hub 117, axial vibration generated in the first hub 117 during shifting is transferred as it is to the stopper ring 125. Therefore, there is a problem in that durability of the stopper ring 125 is deteriorated.

Moreover, the first hub 117, which is assembled to or disassembled from the first drive plate 123 during assembly or disassembly of the dry double clutch 101, may apply impact to the stopper ring 125. Therefore, there are problems in that, due to the impact when such assembly or disassembly is repeated, the stopper ring 125 is damaged to deteriorate durability thereof and assembly work is difficult.

DISCLOSURE

Technical Problem

Accordingly, the present invention has been made in view of the above-mentioned problem, and an object thereof is to provide a dry double clutch in which, in spline coupling between a connector coupled to a damper flywheel for transmission of power from an engine to a transmission and a connection plate coupled to a set double clutch, the connector is coupled to a cover and a washer so as to reduce backlash and improve axial damping performance.

In addition, another object of the present invention is to provide a dry double clutch enhancing shock-absorbing performance of an assembly structure, in which a first hub is coupled to a first drive plate of a first clutch disc, against the first hub, thereby improving durability and assembly of the assembly structure, particularly a stopper ring.

Technical Solution

In accordance with an aspect of the present invention, a dry double clutch includes a damper flywheel coupled to an engine and a set double clutch coupled to the damper flywheel to transmit power of the engine to a transmission, wherein the damper flywheel includes a connector which is coupled to a drive plate of the damper flywheel so as to be spline-coupled to a connection plate of the set double clutch; a cover which is resiliently coupled rotatably relative to the connector along a circumferential direction thereof to compensate for backlash between the connection plate and the connector; and a first resilient member which is mounted on the connector to resiliently press the cover in the circumferential direction of the connector, and a first clutch disc of the set double clutch has an assembly structure consisting of a stopper ring which is supported on inner surfaces of the first clutch disc and a first hub toward the transmission to enclose a boundary portion between the first clutch disc and the first hub; a retainer ring which is supported on outer surfaces of the first clutch disc and the first hub toward the engine to be coupled to the stopper ring facing the retainer ring with the first clutch disc being interposed therebetween, thereby enclosing the boundary portion; and a resilient washer which is interposed between the inner surfaces of the first hub and a first drive plate and the stopper ring to resiliently support the first hub.

In addition, the dry double clutch may further include a second resilient member which is mounted on the connector to resiliently press the cover in an axial direction of the connector.

In addition, the second resilient member may be a plurality of washers arranged in the circumferential direction of the connector between the connector and the cover.

In addition, the second resilient member may be a ring washer arranged coaxially with the connector between the connector and the cover.

In addition, the ring washer may be formed with a plurality of cut portions which is circumferentially recessed along an outer peripheral end of an inclined portion of the ring washer.

In addition, the second resilient member may axially restrict the cover so as not to be decoupled from the connector and allow the cover to be circumferentially rotated so that the second resilient member is coupled to the connector by a rivet passing through the cover while being rotatable relative to the connector.

In addition, the cover may be formed, on an outer periphery thereof, with at least one vertical protrusion portion, and the protrusion portion may be formed to face a tooth surface of a spline gear on an outer periphery of the connector so as to be capable of matching therewith.

In addition, a width of a tooth covered by the protrusion portion, of widths of teeth on the spline gear, may be equal to or more than a width of a tooth formed on an inner periphery of the connection plate.

In addition, a distance between teeth with the protrusion portion being interposed therebetween, of distances between teeth and other teeth on the spline gear, may be larger than a distance between teeth without the protrusion portion being interposed therebetween.

In addition, the protrusion portions may be formed on an outer periphery of a ring portion of the cover at regular intervals, and the teeth covered by the protrusion portions on the spline gear may also be formed on an outer periphery of the connector at regular intervals.

In addition, the first resilient member may be a coil spring, and the cover may be formed with a spring support portion which protrudes toward the connector so as to be capable of circumferentially applying resilient force to the coil spring.

In addition, resultant force of force applied to the cover by the first resilient member and force applied to the cover by the second resilient member may act on the cover in an oblique direction.

In addition, the dry double clutch may further include a snap ring which is interposed between the retainer ring and the outer surfaces of the first drive plate and the first hub in a snap manner such that the snap ring prevents the first hub from being decoupled from an opening portion of the first drive plate.

In addition, the resilient washer may have an annular body which is inclined such that an inner periphery of the resilient washer further protrudes toward the engine than an outer periphery thereof, and the stopper ring may be formed with a seating seat which is concavely recessed toward the transmission along an inner periphery of the stopper ring so as to seat the resilient washer.

In addition, the outer periphery of the resilient washer may be formed with a plurality of catching grooves which is circumferentially cut.

In addition, the stopper ring may be formed with one or more catching means which protrude from the seating seat so that the catching means are caught by the catching grooves of the resilient washer in order to prevent relative rotation of the resilient washer.

In addition, the stopper ring may be formed with one or more catching protrusions which protrude radially inwardly from a body thereof and are raised upward from the seating seat by a height difference between each of the catching protrusion and the seating seat, so that the catching protrusions are caught by the catching grooves of the resilient washer in order to prevent relative rotation of the resilient washer.

BRIEF DESCRIPTION OF DRAWINGS

The above and other objects, features and other advantages of the present invention will be more clearly understood from the following detailed description taken in conjunction with the accompanying drawings.

DESCRIPTION OF REFERENCE NUMERALS

Figure 1:
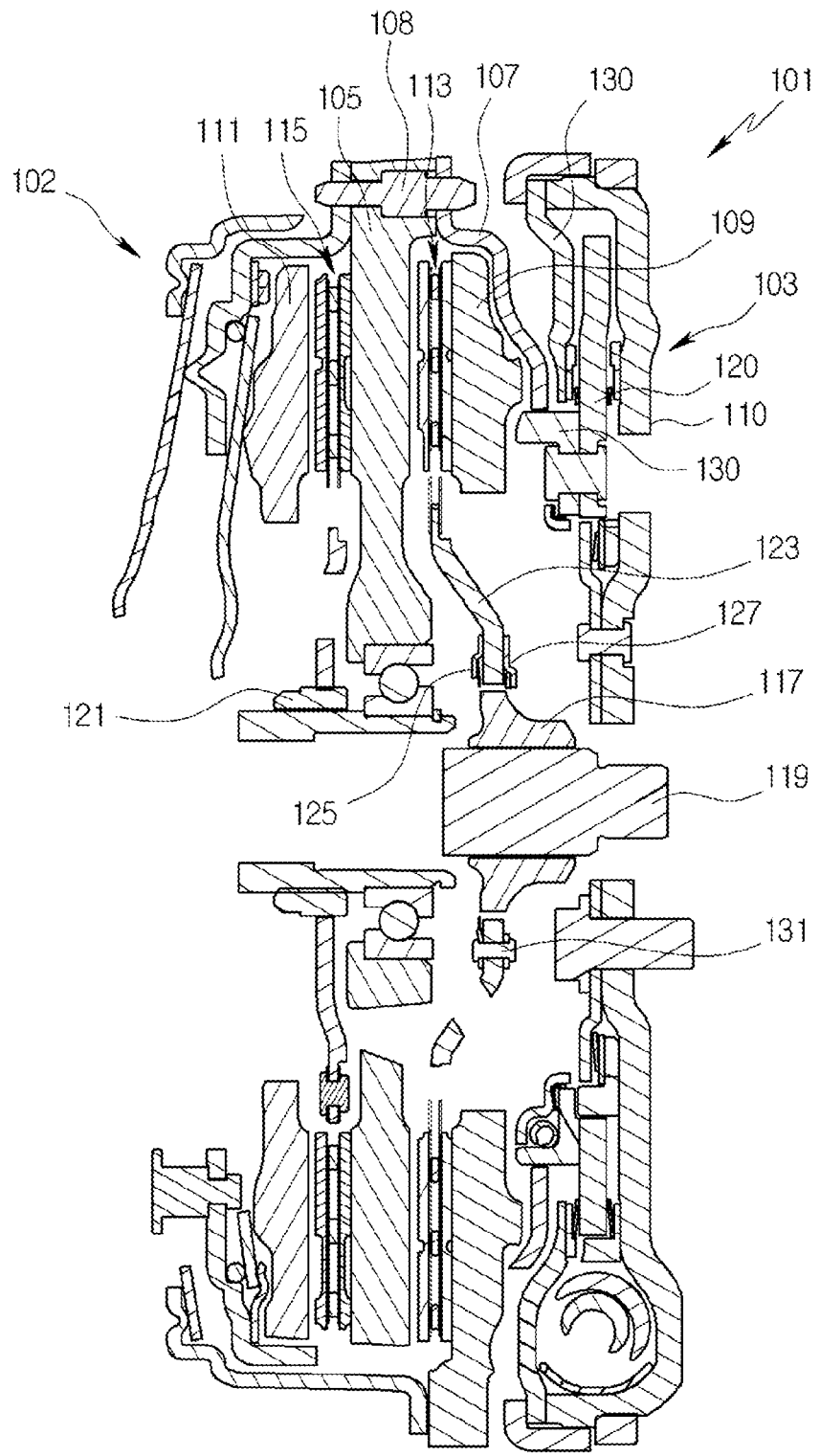
FIG. 1 is a front cross-sectional view illustrating a conventional dry double clutch, components of which are partially omitted.
Figure 2:
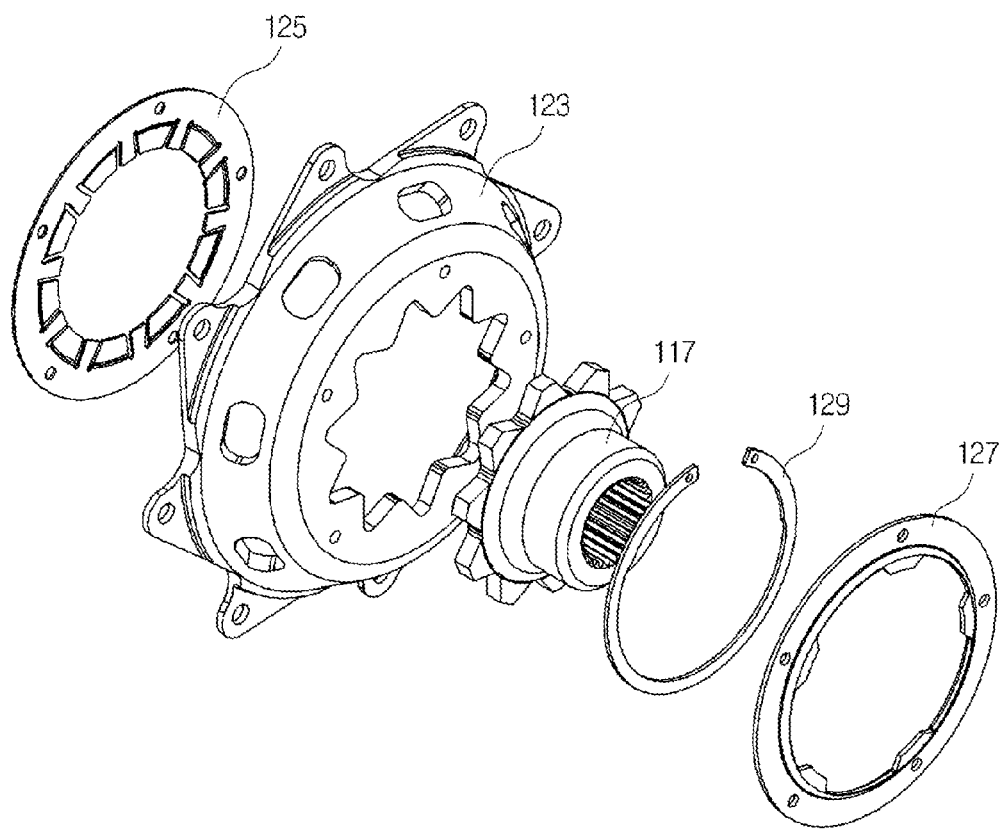
FIG. 2 is an exploded perspective view illustrating an assembly structure of a first clutch disc shown in FIG. 1.

100: dry double clutch,
200: set double clutch
210: first pressure plate,
215: intermediate plate
227: clutch plate,
250: first clutch disc
251: first drive plate,
255: first hub
258: opening portion,
271: stopper ring
273: retainer ring,
275: resilient washer
277: snap ring,
287: seating seat
291: catching groove,
295: catching protrusion
300: damper flywheel,
400: connection plate
500: transmission housing,
600: connector
614: washer,
614': ring washer
616: coil spring,
700: cover

BEST MODE FOR INVENTION

Reference will now be made in detail to embodiments of the present invention, examples of which are illustrated in the accompanying drawings.

Figure 3:
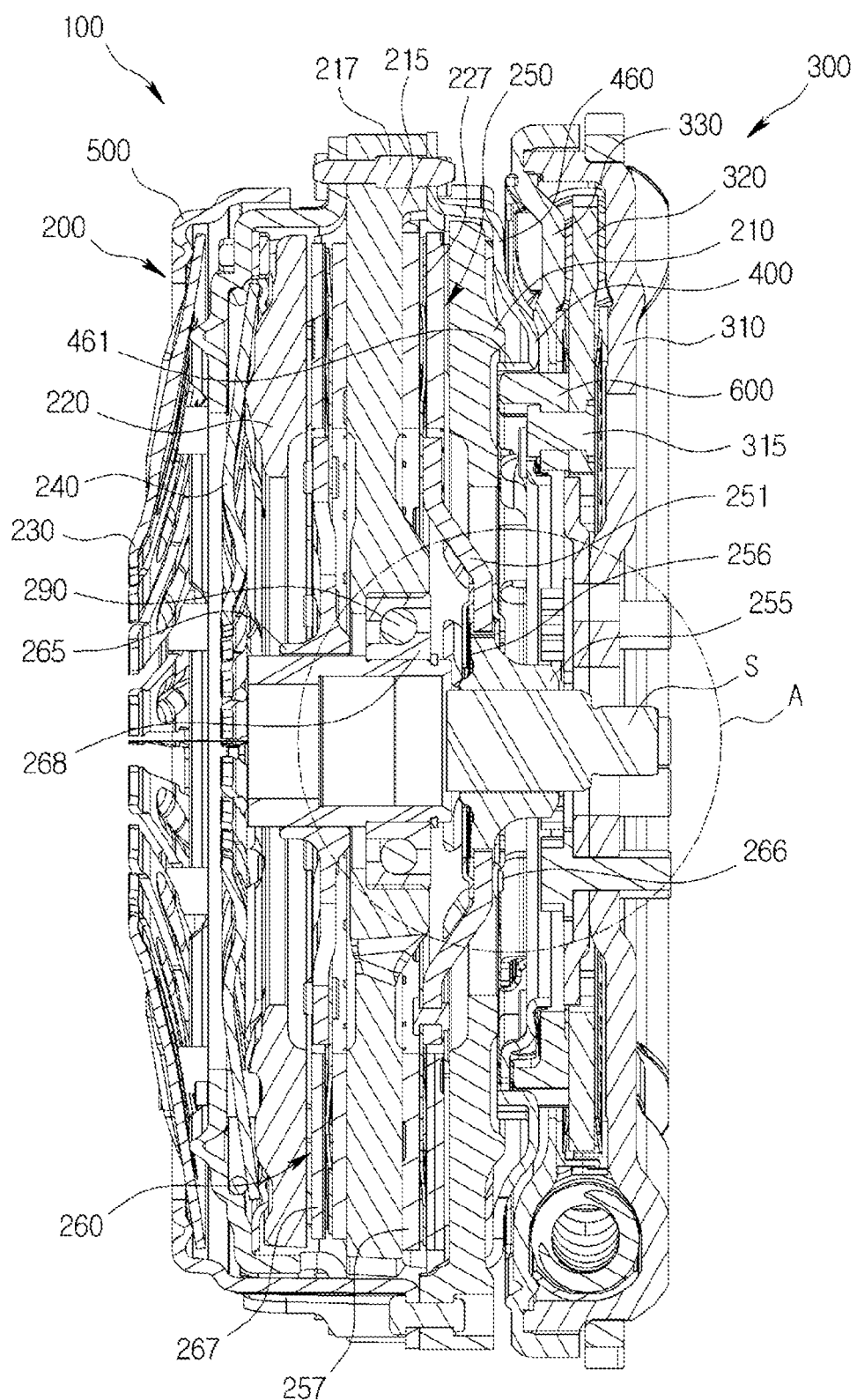
FIG. 3 is a front cross-sectional view illustrating a dry double clutch according to an embodiment of the present invention.
Figure 4:
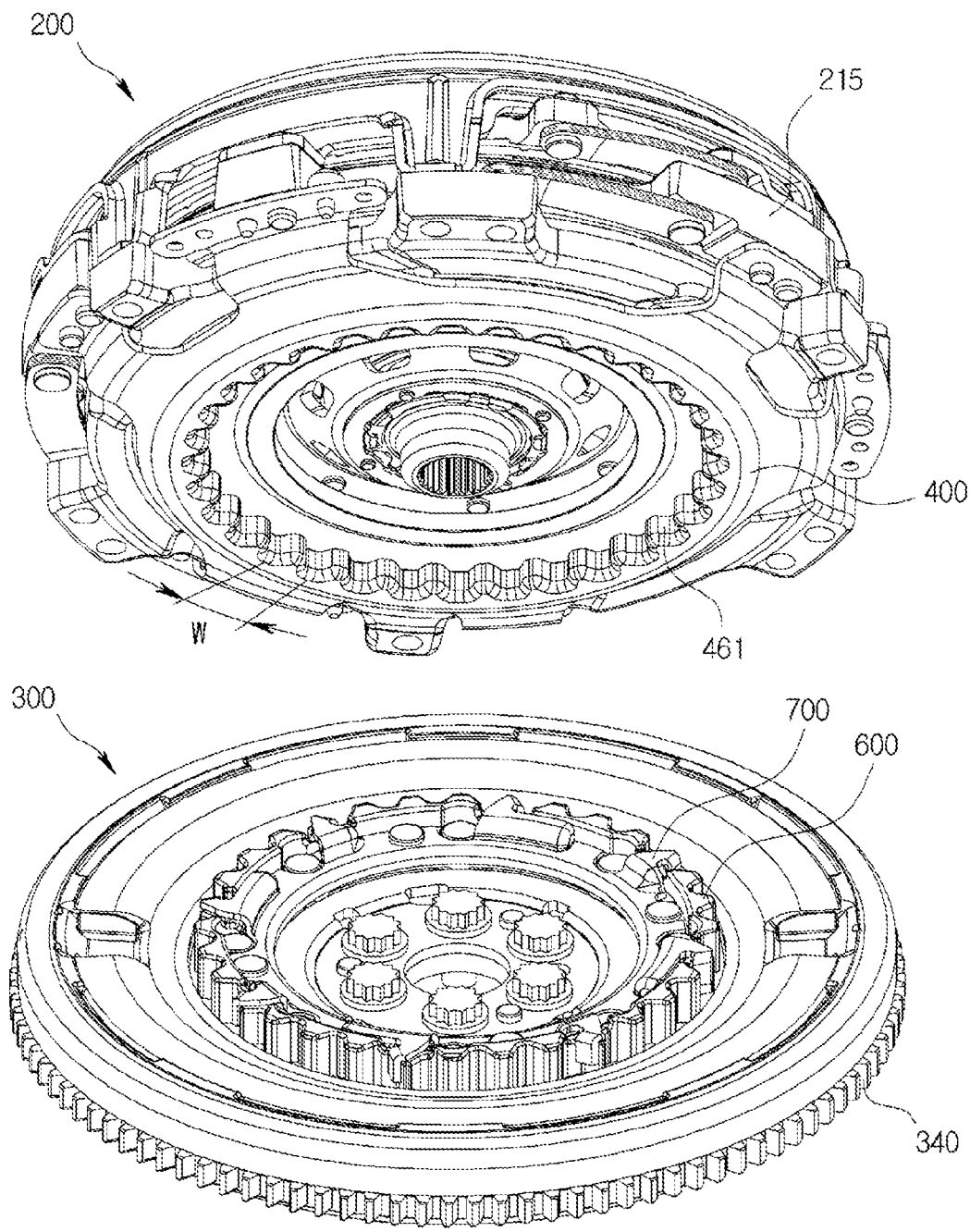
FIG. 4 is an exploded perspective view illustrating a set double clutch and a damper flywheel according to the embodiment of the present invention, a connector being coupled with a cover in the damper flywheel.

FIG. 3 is a cross-sectional view illustrating a dry double clutch according to an embodiment of the present invention. FIG. 4 is a view illustrating a decoupled state of a set double clutch and a damper flywheel of the dry double clutch according to the embodiment of the present invention.

FIG. 3 is a cross-sectional view illustrating the dry double clutch according to the embodiment of the present invention. The dry double clutch 100 is mainly divided into a set double clutch 200 and a damper flywheel 300. First, the damper flywheel 300 is coupled to an engine side and includes a primary wheel 310, a drive plate 320, a primary cover 330, a connector 600, etc. The set double clutch 200 is connected to a transmission side and includes a first pressure plate 210, a second pressure plate 220, a central plate 215, a first diaphragm spring 230, a second diaphragm spring 240, a first clutch disc 250, a second clutch disc 260, a snap ring 277, a support bearing 268, a connection plate 400, etc. After the set double clutch 200 and the damper flywheel 300 having the above-mentioned configurations are respectively coupled to the transmission side and the engine side, the connection plate 400 of the set double clutch 200 is connected to the connector 600 of the damper flywheel 300 by means of spline coupling therebetween.

An external appearance of the damper flywheel 300 is defined by the primary wheel 310 and the primary cover 330. The primary wheel 310 is coupled to the engine side by bolts. The drive plate 320 is received between the primary wheel 310 and the primary cover 330, and has an annular shape. A flange portion (not shown) extends from an outer peripheral portion of the drive plate 320 and comes into contact with a torsion spring (not shown). The drive plate 320 is connected to the connector 600 by rivets 315 so as to transfer torque of the drive plate 320 to the connection plate 400. That is, the damper flywheel 300 has a structure similar to a double mass flywheel (DMF).

Hereinafter, the configuration of the set double clutch 200 will be described. The central plate 215 of the set double clutch 200 is coupled to the connection plate 400 by connection bolts 217. The first and second pressure plates 210 and 220 press facings 257 and 267 of the clutch disc so as to rotate the central plate 215. The central plate 215 is rotatably supported by the support bearing 268 between the second hub 265 and the snap ring 277 fitted on the second hub 265. The snap ring 277 serves to support a hollow shaft of two shafts of a double clutch transmission (not shown) such that the hollow shaft is not decoupled therefrom. The first clutch disc 250 in which the first hub 255 is fitted at a center thereof is located at a lower side of the central plate 215, and the first hub 255 is coupled with a solid shaft of the transmission. The second clutch disc 260 in which the second hub 265 is fitted at a center thereof is located at an upper side of the central plate 215, and the second hub 265 is coupled with the hollow shaft of the two shafts of the transmission.

A transmission housing 500 receives the set double clutch 200 and the damper flywheel 300 and is connected to a cylinder block of an engine. The transmission housing 500 is coupled with a guide tube (not shown) which guides first and second clutch release operating bearing (not shown) toward the engine. The guide tube 515 is coupled to the transmission housing 500 by bolts, and the shaft of the transmission passes through a hollow hole. In this case, the first operating bearing 510 slides on an outer inclined surface of the guide tube 515 and the second operating bearing 520 slides on an inner inclined surface of the guide tube 515. The respective clutch release operating bearings 510 and 520 stroke the first and second diaphragm springs 230 and 240 to pull or push the pressure plates 210 and 220 toward the central plate 215, thereby enabling power to be transmitted by friction generated by the facings 257 and 267 of the clutch disc. Here, when the first operating bearing 510 pushes the first diaphragm spring 230, the first pressure plate 210 at the lower side of the central plate 215 is pulled so that the facing 257 is pressed to the central plate 215. On the other hand, when the second operating bearing 520 pushes the second diaphragm spring 240, the second pressure plate 220 is pushed so that the facing 267 is pressed to the central plate 215. The set double clutch 200 of the present invention uses a method in which the clutch release operating bearings 510 and 520 stroke the diaphragm springs 230 and 240 by pushing them, in order to transmit power of the engine to the transmission.

FIG. 4 is a view illustrating a decoupled state of the set double clutch and the damper flywheel according to the embodiment of the present invention.

In the set double clutch 200, the connection plate 400 having a hollow hole includes a plurality of extension portions 460, and the extension portions 460 are fixedly connected to fastening portions extending from the outer periphery of the central plate 215. In addition, the hollow hole of the connection plate has a hub structure and is formed with teeth for spline coupling. In this case, as shown in FIGS. 3 and 4, each tooth portion 461 is bent inwardly toward the first pressure plate 210 by 90° to increase a contact area with an outer peripheral surface of the connector 600, thereby enabling more stable movement.

The outer periphery of the damper flywheel 300 is coupled with a ring gear 340 for rotating the damper flywheel during starting of the engine by an engine starter motor (not shown). As shown in FIG. 3, the connector 600, which has a shaft structure and is spline-coupled to the set double clutch 200, is coupled to the drive plate 320 by means of the rivets 315. Accordingly, torque of the drive plate 320 is transferred to the connector 600 and is then transferred to the connection plate 400 via the connector 600.

Figure 5:
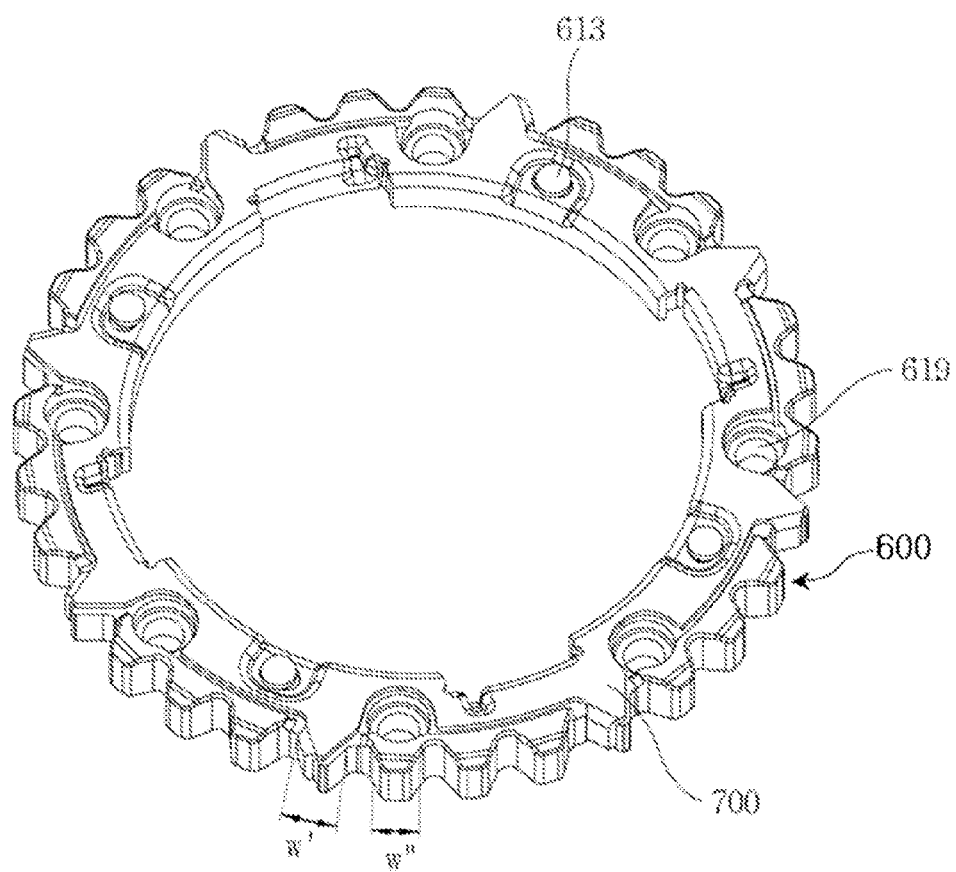
FIG. 5 is a perspective view illustrating the connector coupled with the cover according to the embodiment of the present invention.
Figure 6:
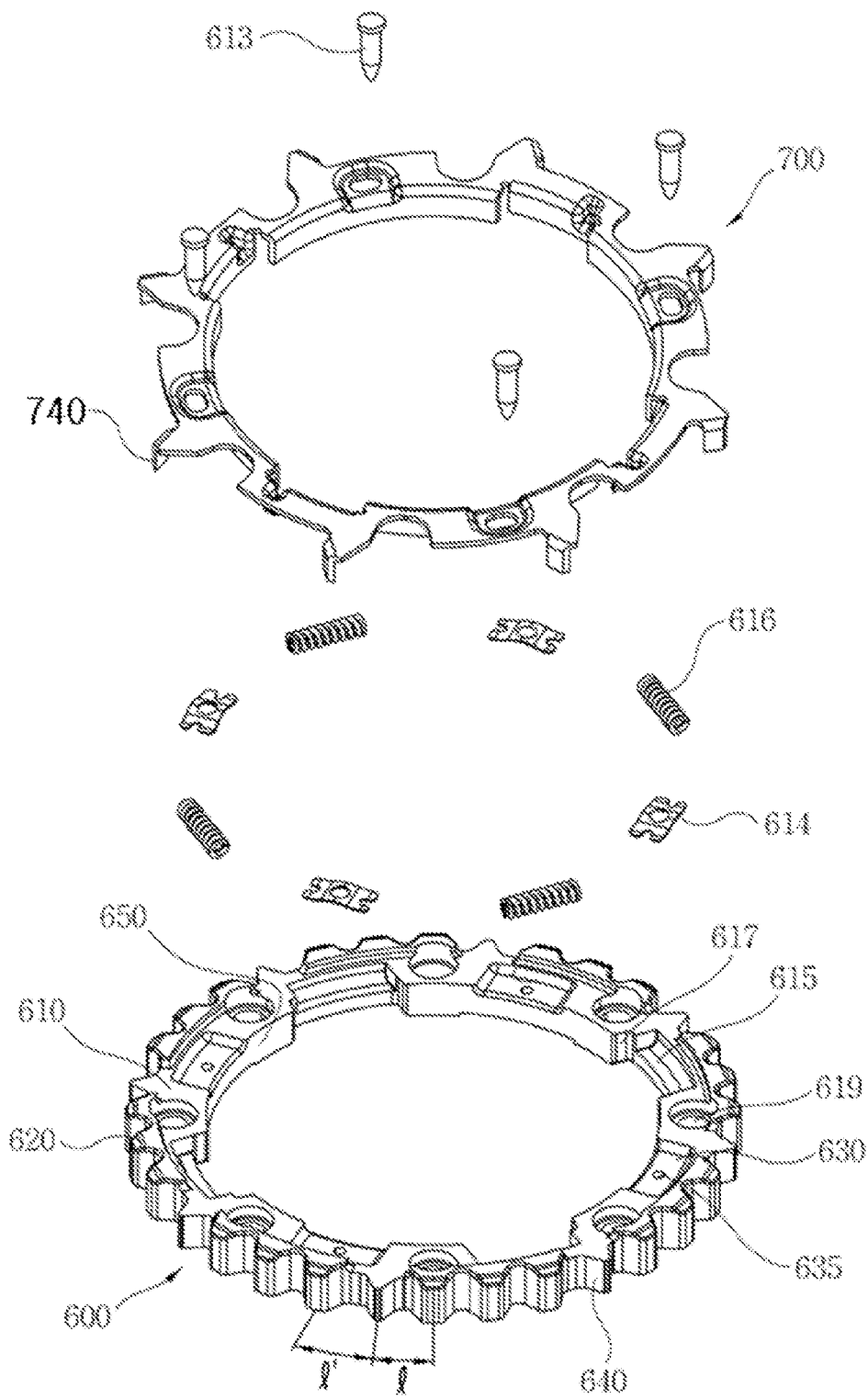
FIG. 6 is an exploded perspective view illustrating a decoupled state of the cover and the connector according to the embodiment of the present invention.
Figure 7:
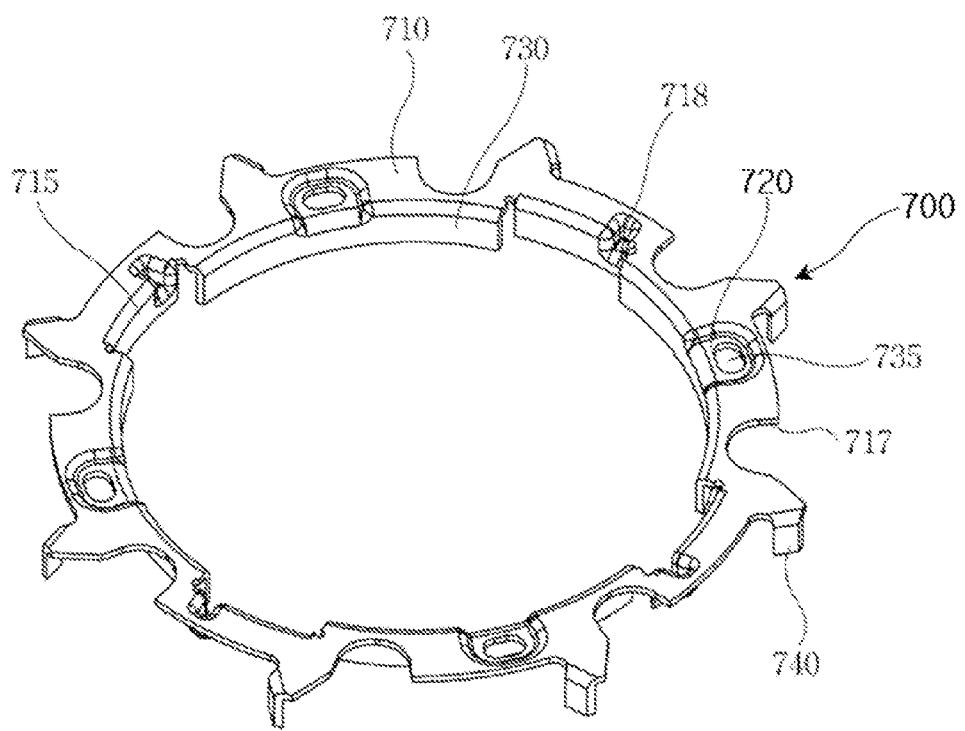
FIG. 7 is a perspective view illustrating the cover coupled to the connector according to the embodiment of the present invention.

FIG. 5 is a view illustrating a coupled state of the connector and the cover according to the embodiment of the present invention. FIG. 6 is a view illustrating a decoupled state of the cover and the connector according to the embodiment the present invention. FIG. 7 is a view illustrating the cover according to the embodiment of the present invention.

The connector 600 has a hollow ring shape and includes a ring portion 610. The ring portion 610 is formed, on an outer peripheral surface thereof, with a spline gear 620 for spline coupling. The ring portion 610 is formed with a plurality of fastening holes 619 arranged in a circumferential direction thereof such that the drive plate 320 is coupled to the connector 600 through the fastening holes 619 by the rivets 315. In addition, a plurality of grooves 617 is formed on an inner peripheral surface 650 of the connector 600 in a circumferential direction thereof. The inner peripheral surface 650 of the connector 600 is formed with spring places 615 arranged in radial directions of the grooves 617 such that first resilient members such as coil springs 616 may be received in the spring places 615, in order to reduce backlash in the spline coupling between the connector and the connection plate 400. Accordingly, the cover 700 coupled to the upper portion of the connector 600 is circumferentially supported by the coil springs 616.

In addition, second resilient members such as washers 614, which support axial load on the upper surface of the ring portion 610 so as to compensate for misalignment, are located between the connector 600 and the cover 700. The connector 600 is formed with seating grooves 630 receiving the washers 614 such that the washers 614 may apply resilient force in the axial direction of the connector. Each of the seating grooves 630 may be formed to correspond to the shape of the associated washer 614. The washer 164 may have any shape as long as it supports the axial load, but the washer 614 preferably has a convex shape at a central portion thereof. In the present invention, the washer 614 has an H-shape consisting of four legs and a convex portion, and the axial load may be supported by the central convex portion. The washer 614 is coupled to the connector 600 by an associated rivet 613. The rivet 613 simultaneously passes through an associated cover coupling hole 735 formed on the cover 700 and an associated washer fastening hole 635, thereby allowing the cover, the washer, and the connector to be simultaneously fastened to each other. That is, the washer 614 is received in the seating groove 630 of the connector 600 and the cover coupling hole 735 of the cover 700 and the washer fastening hole 635 of the connector 600 correspond to each other, thereby allowing the cover 700 to be coupled to the connector 600 by means of the rivet 613. Thus, by such a simple method, the cover 700, the washer 614, and the connector 600 are connected to each other.

The cover 700 has a hollow ring shape and includes a ring portion 710 and protrusion portions 740 extending from an outer peripheral surface of the ring portion in an axial direction thereof. In addition, the ring portion 710 may also be formed, on an inner peripheral surface thereof, with a support portion 730 extending along a circumferential direction of the ring portion in an axial direction thereof. The ring portion 710 is formed with the cover coupling hole 735 through which the associated rivet passes when the ring portion 710 is coupled to the connector 600 by the rivet, the cover 700 is axially restricted by the rivet 613 so as to prevent the cover 700 from being decoupled from the connector 600. The cover coupling hole 735 is circumferentially formed in plural number such that the cover 700 may be stably fastened to the connector 600. In addition, the ring portion 710 is formed, on an upper surface thereof, with seating portions 720 such that rotation motion is disturbed by heads of the rivets during relative rotation of the cover 700. In this case, the cover coupling hole 735 formed on each seating portion 720 is preferably formed larger than the outer diameter of the rivet 613. Particularly, the cover coupling hole 735 is formed in an oval shape so as not to disturb movement of the cover 700. Consequently, this enables the cover 700 to rotate in the circumferential direction thereof so that the cover 700 may rotate relative to the connector 700 in a clockwise or counterclockwise direction. Meanwhile, the ring portion 710 is formed, at the outer peripheral surface thereof, with semicircular grooves 717 such that the rivets 613 are not disturbed when the cover 700 is fastened to the connector 600 and then the connector 600 is coupled to the drive plate 320 through the fastening holes 619 by the rivets.

In addition, the inner peripheral surface of the ring portion 710 may be formed with the support portion 730 extending along the circumferential direction of the ring portion so as to radially support the cover 700 when the cover 700 is fastened to the connector 600. The support portion 730 is formed to correspond to the inner peripheral surface 650 of the connector 600, and a stepped portion 715, which is radially recessed to correspond to each groove 617 on the inner peripheral surface of the connector, is located along the circumferential direction of the support portion 730. Accordingly, the stepped portion 715 may prevent the associated coil spring 616 of the connector 600 from being decoupled therefrom. In addition, a spring support portion 718 for support of the coil spring 616 is formed across the upper surface of the ring portion 710 and the stepped portion 715. The spring support portion 718 is formed by being embossed on a mold during injection molding of the cover 700.

In addition, the plural protrusion portions 740 face a tooth surface of the gear 620 formed on the outer periphery of the connector 600 and extend from the outer peripheral surface of the ring portion 710 in the axial direction thereof to be formed at regular intervals. Each of the protrusion portions 740 is preferably formed in a square plate shape to correspond to the tooth surface 640 of the spline gear 620 while facing the tooth surface 640 of the spline gear 620 on the outer periphery of the connector so as to match therewith. A plurality of teeth of the connector 600 facing the protrusion portions 740 is formed along the circumferential direction. Accordingly, when the cover 700 is coupled to the connector 600, the protrusion portions 740 correspondingly face the tooth surface of the gear 620. In this case, the cover 700 has a gap between the protrusion portions 740 and the tooth surface 640 of the connector 600. This is because the cover 700 is resiliently pressed in the circumferential direction by the coil springs 616, thereby allowing backlash to be not generated during spline coupling.

Meanwhile, when a width of teeth on the inner periphery of the connection plate 400 is "w", a width w" of teeth on the gear 620 of the connector has to be smaller than the "w" so that these may be assembled. In this case, in order to tightly couple them as much as possible, the width w' of the teeth covered by the protrusion portions 740 in the gear 620 of the connector 600 is equal to or more than the "w". Consequently, the cover 700 is assembled to the connector 600 while the coil springs 616 are compressed such that the cover 700 rotates relative to the connector 600 in the counterclockwise direction during assembly thereof, thereby enabling backlash to be reduced. That is, when the cover 700 is coupled to the connector 600, the cover 700 is resiliently pushed in the circumferential direction (clockwise direction) by the coil springs 616. Therefore, when the set double clutch 200 is spline-coupled to the damper flywheel 300, the cover 700 is coupled to the connector while being pressed in the counterclockwise direction.

In addition, a distance l' between teeth with the protrusion portions 740 being interposed therebetween is preferably larger than a distance l between teeth when not so. This is because a constant interval is required between the tooth surface 640 of the teeth covered by the protrusion portions 740 and the protrusion portions 740.

Hereinafter, a description will be given of operation of the connector 600 coupled with the cover 700. Power generated by the engine is transmitted to the connector 600 spline-coupled to the drive plate and is then transmitted to the connection plate 400 spline-coupled to the connector 600. In this case, backlash is caused between the teeth which are spline-coupled. However, since resilient force is applied in the circumferential direction by the coil springs 616 while the cover 700 is coupled to the connector 600 and the protrusion portions 740 of the cover 700 face the tooth surface 640 of the gear 620 of the connector 600, the backlash is reduced when the connection plate 420 engages with the connector 600. When the vehicle is accelerated or decelerated while the rotation direction of the engine is constant, the connector 600 rotates relative to the connection plate 400 in the clockwise or counterclockwise direction in spline coupling therebetween. Accordingly, the backlash is reduced by the protrusion portions 740, and thus impact, vibration, noise, and the like may be prevented between the connector 600 and the connection plate 400 which are spline-coupled. Consequently, it may be possible to increase durability of the vehicle. In addition, since the washers 614 installed between the connector 600 and the cover 700 apply axial damping to the cover 700, it may be possible to compensate for misalignment which may be caused during coupling of the engine and the transmission. In addition, resultant force of tangential force of the coil spring 616 and vertical force of the rivet 613 is applied to the cover 600 in an oblique direction such as a diagonal direction.

Hereinafter, another embodiment of the present invention will be described with reference to the accompanying drawings.

Figure 8:
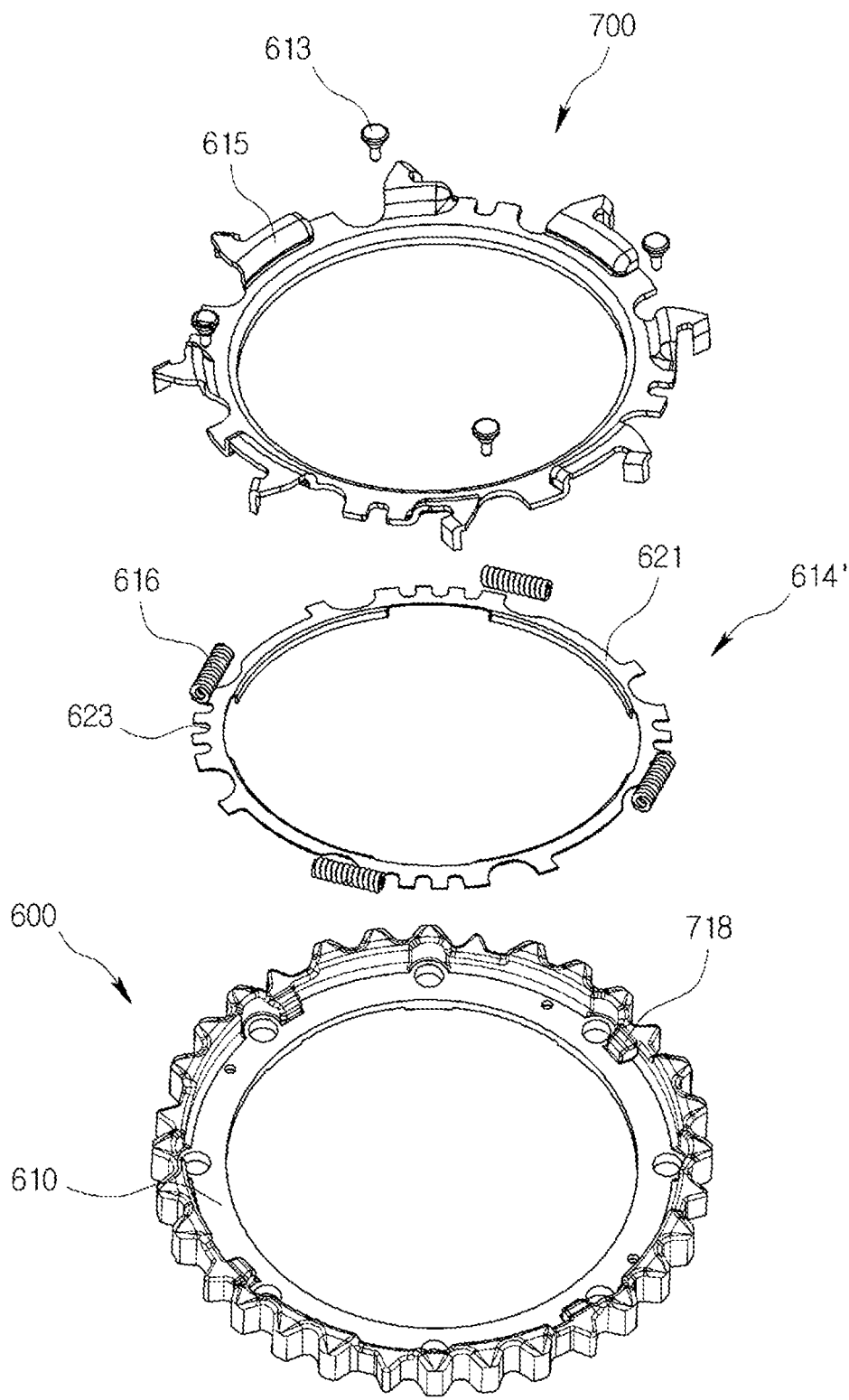
FIG. 8 is an exploded perspective view illustrating a decoupled state of a cover and a connector according to another embodiment of the present invention.

FIG. 8 is a view illustrating a decoupled state of a cover and a connector of a dry double clutch according to another embodiment of the present invention.

As seen in FIG. 8, since a connector 600, a cover 700, and first resilient members 616 according to the present embodiment are similar to those of the above-mentioned first embodiment, no description will be given of the same components and only differences therebetween will be described.

A second resilient member of the dry double clutch according to the present embodiment differs from that of the above-mentioned embodiment. Therefore, in order to compensate for misalignment, a ring washer 614' is coaxially arranged and mounted on an upper surface of a ring portion 610 of the connector 600 between the connector 600 and the cover 700 so as to support axial load.

To this end, the connector 600 is similar to the connector 600 of the above-mentioned embodiment, except that the ring portion 610 protrudes radially inwardly to form an annular catching part and spring support portions 718 for circumferentially supporting the coil springs 616 protrude radially inwardly from the ring portion 610 at regular intervals. In addition, the cover 700 circumferentially pressed by the coil springs 616 also has the same configuration as the cover 700 of the first embodiment, except for being flat to the same height without the spring places 615 protruding upward for receiving the coil springs 616.

Meanwhile, the ring washer 614' is formed with an inclined portion 621 in which an inner peripheral end of the ring washer is directed upward and is then inclined toward an outer peripheral end thereof, so as to have axial resilience. The ring washer 614' is formed with a plurality of cut portions 623 arranged circumferentially along the outer peripheral end, and each of the cut portions 623 is concavely cut inward of the outer peripheral end to thereby reduce overall rigidity of the inclined portion 621 against axial load. Consequently, the inclined portion 621 axially has larger resilience, compared to an inclined portion 621 having the same shape without the cut portions 623.

Figure 9:
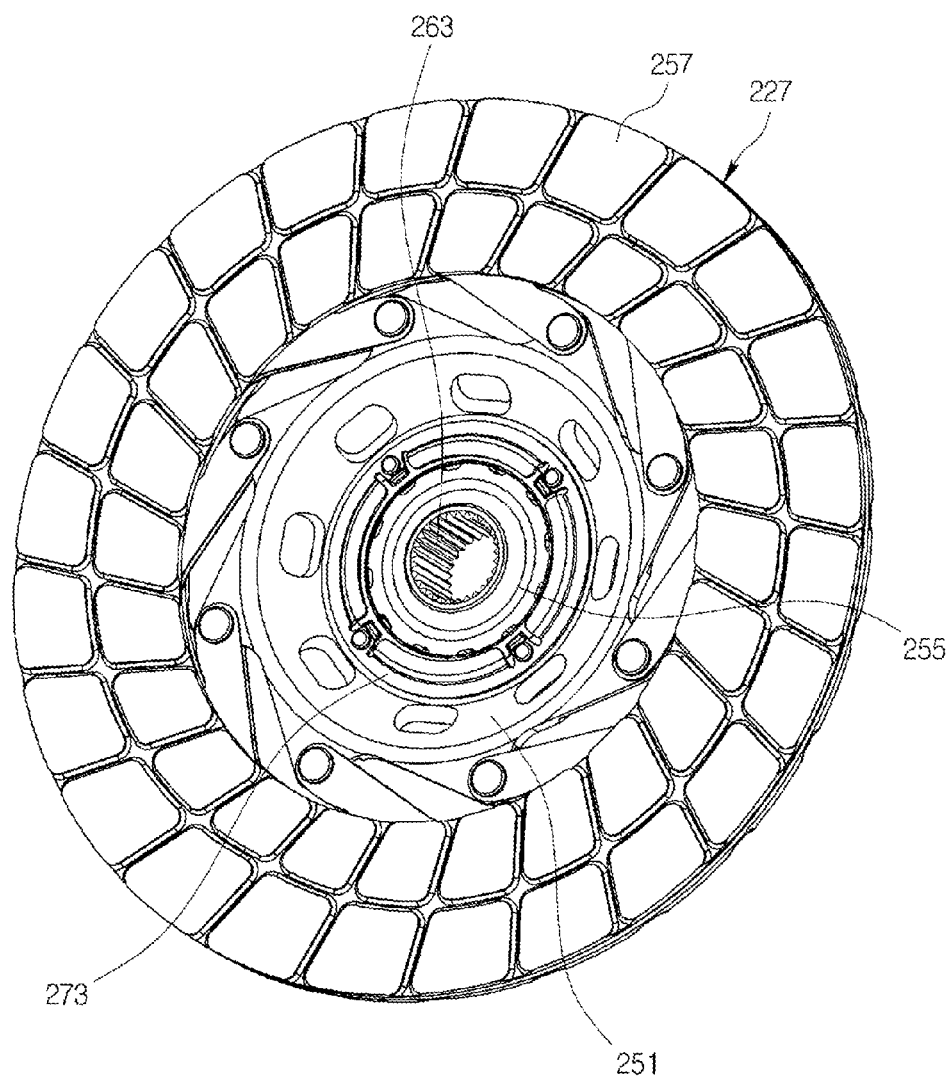
FIG. 9 is a perspective view illustrating a first clutch disc shown in FIG. 3.

Meanwhile, a clutch plate 227 of the dry double clutch 100 according to the present invention forms a friction surface of the first clutch disc 250. As shown in FIG. 9, the clutch plate 227 has a flat shape in the form of coin and the facings 257 serving as a friction pad are attached to front and back surfaces of the clutch plate 227. In addition, the clutch plate 227 is interposed between the central plate 215 and the first pressure plate 210 and comes into contact with or is decoupled from the central plate 215 and the first pressure plate 210 through the facings 257, thereby controlling power during shifting.

The first drive plate 251 forms a body of the first clutch disc 250. As shown in FIGS. 3 and 9 to 12, the first drive plate 251 has a hollow truncated cone shape protruding gently toward the engine as a whole. An outer periphery 297 of the first drive plate is coupled to an inner periphery of the clutch plate 227 by means of the rivets 315, and an opening portion 258 in which the first hub 255 is fitted passes through a center of the first drive plate. In this case, the opening portion 258 is formed on an inner peripheral surface thereof with a female spline 253 such that the first hub 255 fitted in the inner periphery of the opening portion is not rotated relative to the opening portion.

The first hub 255 supports the first drive plate 251 and the clutch plate 227 which are continuously arranged in the radial direction thereof such that the first drive plate 251 and the clutch plate 227 are axially movable on a transmission inner input shaft S. As shown in FIGS. 3 and 9 to 12, the first hub 255 is mounted to the opening portion 258 of the first drive plate 251. To this end, the first hub 255 is formed, on an outer peripheral surface thereof, with a male spline 259 corresponding to the female spline 253 on the inner peripheral surface of the opening portion 258. In addition, as shown in FIGS. 3 and 9 to 12, the first hub 255 is penetratively formed, at a central portion thereof, with a shaft hole 261 into which the transmission inner input shaft S is inserted. The shaft hole 261 is formed, on an inner peripheral surface thereof, with a female spline 263 so that the transmission inner input shaft is spline-coupled to the shaft hole 261, thereby enabling the first hub 255 to be supported so as to be axially movable on the transmission inner input shaft.

As describe above, the first clutch disc 250 which is axially supported on the transmission inner input shaft by means of the first hub 255 couples the first hub 255 to the center of the first drive plate 251 by an assembly structure consisting of a stopper ring 271, a retainer ring 273, and the resilient washer 275, as shown in FIGS. 3 and 9 to 12.

Figure 10:
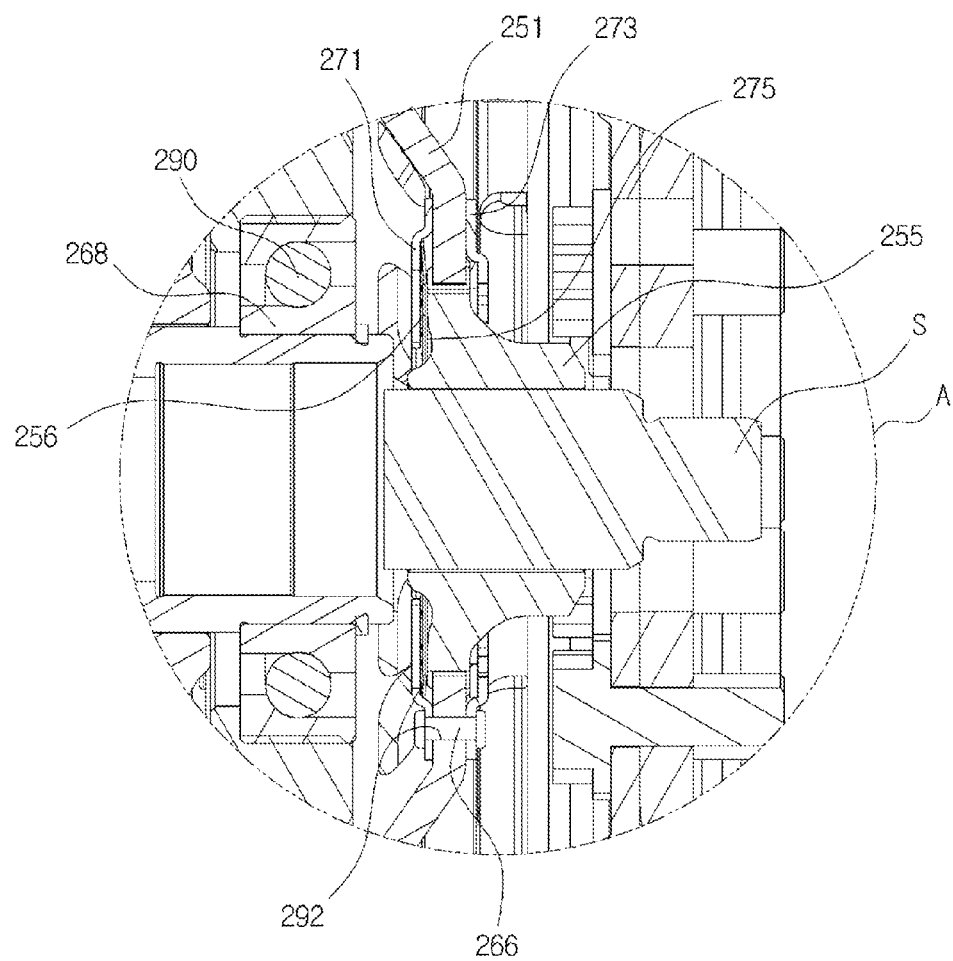
FIG. 10 is a detailed view of portion "A" in FIG. 3.
Figure 11:
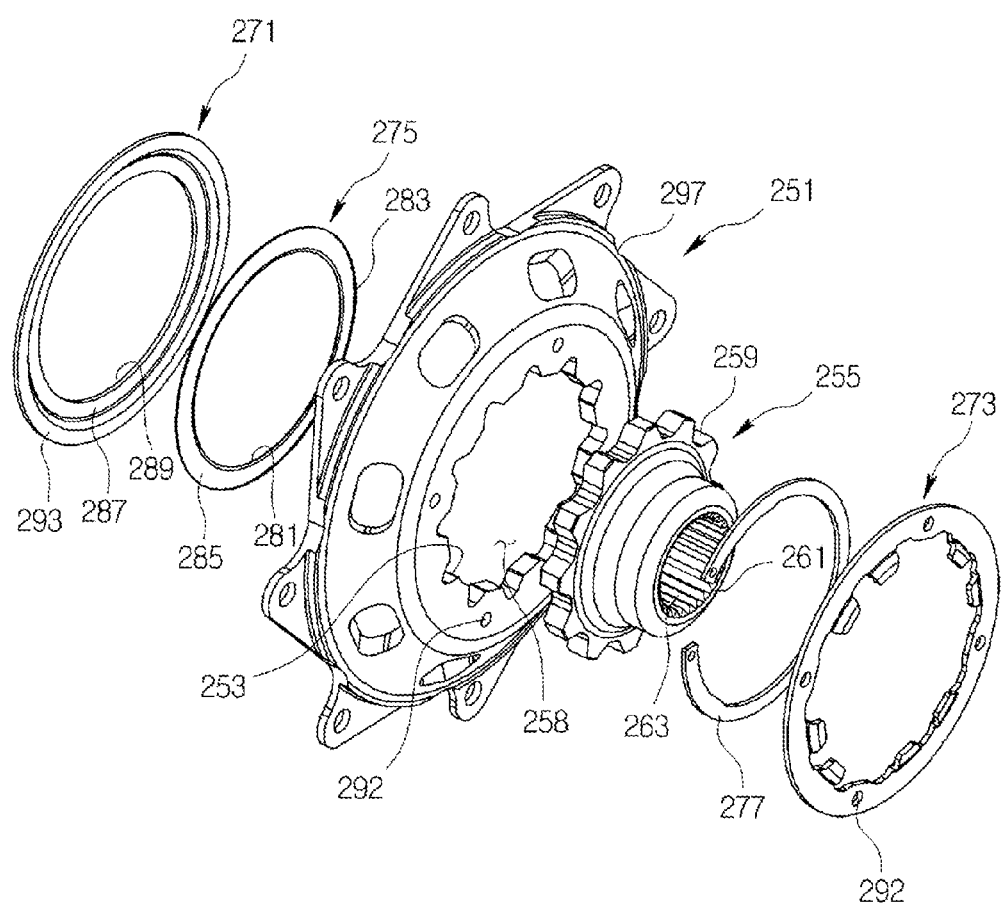
FIG. 11 is an exploded perspective view illustrating an assembly structure of the first clutch disc shown in FIG. 3.

Here, as shown in FIGS. 10 and 11, the stopper ring 271 is supported on the inner surfaces of the first drive plate 251 and the first hub 255, namely, on a surface toward the transmission so as to enclose a boundary portion 256 between the first drive plate 251 and the first hub 255. In this case, the stopper ring 271 is formed with a seating seat 287 which is concavely recessed toward the transmission along an inner periphery 289 of the stopper ring so that the resilient washer 275 is seated to the seating seat 287.

As shown in FIGS. 10 and 11, the retainer ring 273 is formed in a ring shape, similarly to the stopper ring. The retainer ring 273 is supported on the outer surfaces of the first drive plate 251 and the first hub 255, namely, on a surface toward the engine so as to enclose the boundary portion 256 between the first drive plate 251 and the first hub 255. In this case, the retainer ring 273 is coupled to the stopper ring 271 facing the same by rivets 266 passing through the first drive plate 251, as shown in FIG. 10. To this end, the stopper ring 271, the first drive plate 251, and the retainer ring 273 are collinearly formed with a plurality of through-holes 292 through which the rivets 266 pass.

Accordingly, the retainer ring 273 alone may prevent the first hub 255 from being decoupled from the opening portion 258 of the first drive plate 251. More preferably, the snap ring 277 is fitted between the retainer ring 273 and the outer surfaces of the first drive plate 251 and the first hub 255 in a snap manner such that the snap ring 277 may prevent the first hub 255 from being decoupled from the opening portion 258 of the first drive plate 251, as shown in FIGS. 10 and 11.

The resilient washer 275 is a resilient body having a ring shape for axially buffering the first drive plate 251. As shown in FIGS. 3, 10, and 11, the resilient washer 275 is interposed between the inner surfaces of the first drive plate 251 and the first hub 255, namely, the surface toward the transmission and the stopper ring 271 so as to resiliently support the first hub 255 in the axial direction thereof. To this end, an annular body 285 of the resilient washer 275 is inclined in a truncated cone shape such that an inner periphery 281 of the resilient washer 275 further protrudes toward the engine than an outer periphery 283 thereof. In addition, as described above, the stopper ring 271 to support the resilient washer 275 is formed with the seating seat 287 to seat the resilient washer 275, as shown in FIGS. 10 and 11.

Figure 12:
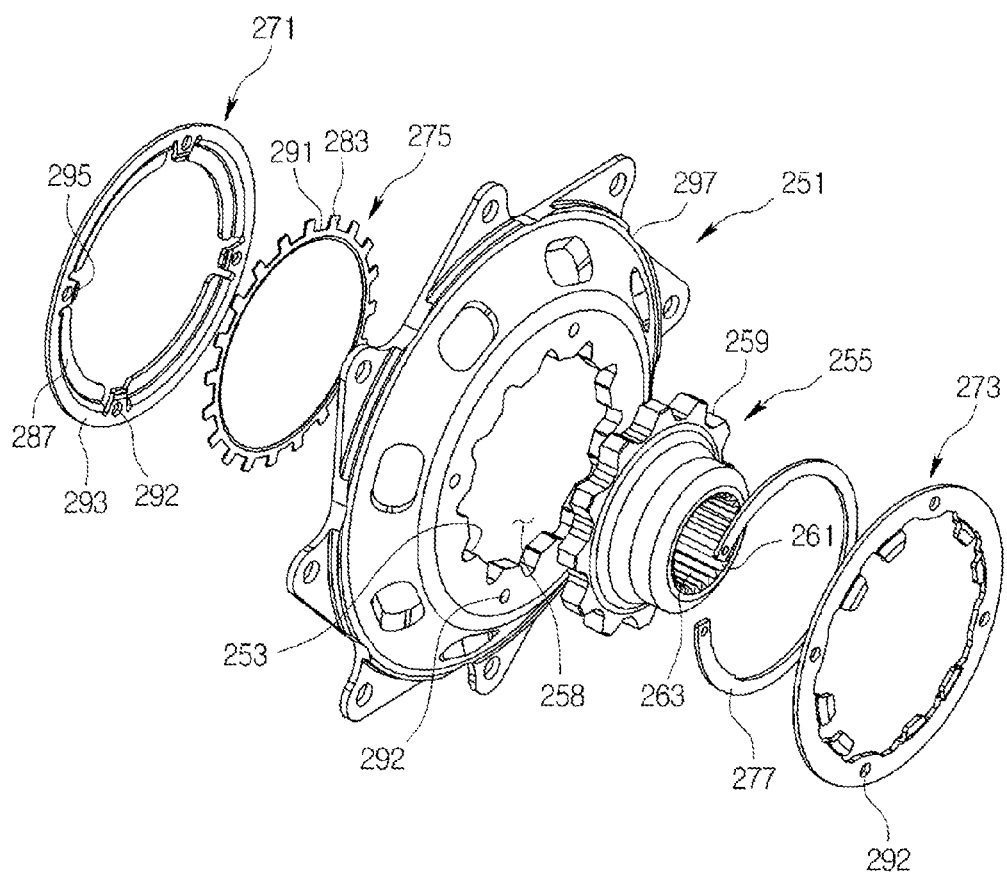
FIG. 12 is an exploded perspective view illustrating a modified assembly structure of the first clutch disc shown in FIG. 4.

In this case, the outer periphery 283 of the resilient washer 275 as the preferable embodiment of the present invention may be formed with a plurality of catching grooves 291 which is circumferentially cut, as shown in FIG. 12. In addition, one or more catching means may be protrusively formed on the seating seat 287 of the stopper ring 271 so that the catching means are caught by the catching grooves 291 of the resilient washer 275 in order to prevent relative rotation of the resilient washer 275. One or more catching protrusions 295 is more preferably used as the catching means, and each of the catching protrusions 295 protrudes radially inwardly from the body 293 of the stopper ring 271 and is raised upward from the seating seat 287 by a height difference between the catching protrusion 295 and the seating seat 287, as shown in FIG. 12.

Accordingly, the dry double clutch 100 according to the present invention controls power transmission in such a manner that the first clutch disc 250 interposed between the central plate 215 and the first pressure plate 210 comes into contact with or is decoupled from the central plate 215 while being pressed or released by the first pressure plate 210 according to shifting operation, as shown in FIG. 3. During assembly of the dry double clutch 100, after the central plate 215 is fixed to the transmission inner input shaft by pressing the bearing 290 and then the clutch plate 227 and the first drive plate 251 which are integrally coupled outside the central plate 215 are first set, the first hub 255 is fastened to the opening portion 258 of the first drive plate 251. Next, the first hub 255 is fixed by the retainer ring 273 and the snap ring 277 so as to finish the assembly.

In this case, since the resilient washer 275 enclosed by the stopper ring 271 resiliently supports the first hub 255 therein as shown in FIG. 10, it may be possible to absorb impact applied from the first hub 255 to the stopper ring 271 during assembly operation and to attenuate axial vibration applied to the first hub 255 or the stopper ring 271 during shifting even when the first hub 255 and the stopper ring 271 are mounted to the vehicle after the assembly.

Various embodiments have been described in the best mode for carrying out the invention.

INDUSTRIAL APPLICABILITY

In accordance with the present invention, since the cover is coupled to the connector of the damper flywheel to reduce backlash in spline coupling therebetween, it may be possible to decrease impact, noise, vibration, and the like caused in teeth between the connector and the connection plate.

In addition, since the teeth are prevented from being damaged by reducing backlash, it may be possible to increase durability of the vehicle.

In addition, since the connector is coupled to the washer so as to axially apply damping performance and torque is circumferentially applied by a coil spring, it may be possible to compensate for misalignment between the engine shaft and the transmission shaft.

In addition, it may be possible to absorb bending and pumping vibration of the engine crank shaft by applying such axial and circumferential loads.

In addition, since the engine and the transmission are easily assembled by spline coupling between the set double clutch and the damper flywheel, assembly time may be shortened and assembly may be enhanced.

In addition, in accordance with the present invention, since axial damping performance is applied to the connector by the ring washer, it may be possible to prevent the washers, such as general washers of the first embodiment, having the center of gravity different from each other from being misaligned or deformed due to centrifugal force during rotation at high speed, to prevent the washers from being lost during assembly, and to easily and accurately perform assembly operation.

In addition, in accordance with the present invention, since the assembly structure is formed by coupling the first drive plate and the first hub of the first clutch disc and the resilient washer is interposed between the stopper ring and the first drive plate and the first hub, thereby axial vibration transferred to the stopper ring though the first hub during shifting to be attenuated by the resilient washer, it may be possible to prevent deterioration of durability of the stopper ring due to the vibration.

In addition, impact applied to the stopper ring during coupling of the first hub finally coupled to the first drive plate when the first clutch disc is assembled is absorbed by the resilient washer. Therefore, even when the first clutch disc is frequently assembled or disassembled, damage of the stopper ring due to the same may be previously prevented and thus it may be possible to further enhance entire assembly convenience.

In addition, since the first hub coupled to the first drive plate has a clearance for axial displacement thereof to the extent corresponding to an amount of axial displacement of the resilient washer, the clutch disc assembly may compensate for axial misalignment of the transmission input shaft.

Although the present invention has been described with respect to the illustrative embodiments, it will be apparent to those skilled in the art that various variations and modifications may be made without departing from the spirit and scope of the invention as defined in the following claims.

The invention claimed is:

1. A dry double clutch comprising a damper flywheel coupled to an engine and a set double clutch coupled to the damper flywheel to transmit power of the engine to a transmission, wherein the damper flywheel comprises:
a connector which is coupled to a drive plate of the damper flywheel so as to be spline-coupled to a connection plate of the set double clutch;
a cover which is resiliently coupled rotatably relative to the connector along a circumferential direction thereof to compensate for backlash between the connection plate and the connector; and
a first resilient member which is mounted on the connector to resiliently press the cover in the circumferential direction of the connector, and wherein a first clutch disc of the set double clutch has an assembly structure comprised of:
a stopper ring which is supported on inner surfaces of the first clutch disc and a first hub toward the transmission to enclose a boundary portion between the first clutch disc and the first hub;
a retainer ring which is supported on outer surfaces of the first clutch disc and the first hub toward the engine to be coupled to the stopper ring facing the retainer ring with the first clutch disc being interposed therebetween, thereby enclosing the boundary portion; and
a resilient washer which is interposed between the inner surfaces of the first hub and a first drive plate and the stopper ring to resiliently support the first hub.

2. The dry double clutch according to claim 1, further comprising a second resilient member which is mounted on the connector to resiliently press the cover in an axial direction of the connector.

3. The dry double clutch according to claim 2, wherein the second resilient member is a plurality of washers arranged in the circumferential direction of the connector between the connector and the cover.

4. The dry double clutch according to claim 2, wherein the second resilient member is a ring washer arranged coaxially with the connector between the connector and the cover.

5. The dry double clutch according to claim 4, wherein the ring washer is formed with a plurality of cut portions which is circumferentially recessed along an outer peripheral end of an inclined portion of the ring washer.

6. The dry double clutch according to claim 3, wherein the second resilient member axially restricts the cover so as not to be decoupled from the connector and allows the cover to be circumferentially rotated so that the second resilient member is coupled to the connector by a rivet passing through the cover while being rotatable relative to the connector.

7. The dry double clutch according to claim 1, wherein the cover is formed, on an outer periphery thereof, with at least one vertical protrusion portion, and the protrusion portion is formed to face a tooth surface of a spline gear on an outer periphery of the connector so as to be capable of matching therewith.

8. The dry double clutch according to claim 7, wherein, a width of a tooth covered by the protrusion portion, of widths of teeth on the spline gear, is equal to or more than a width of a tooth formed on an inner periphery of the connection plate.

9. The dry double clutch according to claim 7, wherein a distance between teeth with the protrusion portion being interposed therebetween, of distances between teeth and other teeth on the spline gear, is larger than a distance between teeth without the protrusion portion being interposed therebetween.

10. The dry double clutch according to claim 7, wherein the protrusion portions are formed on an outer periphery of a ring portion of the cover at regular intervals, and the teeth covered by the protrusion portions on the spline gear are also formed on an outer periphery of the connector at regular intervals.

11. The dry double clutch according to claim 7, wherein the first resilient member is a coil spring, and the cover is formed with a spring support portion which protrudes toward the connector so as to be capable of circumferentially applying resilient force to the coil spring.

12. The dry double clutch according to claim 7, wherein resultant force of force applied to the cover by the first resilient member and force applied to the cover by the second resilient member acts on the cover in an oblique direction.

13. The dry double clutch according to claim 1, further comprising a snap ring which is interposed between the retainer ring and the outer surfaces of the first drive plate and the first hub in a snap manner such that the snap ring prevents the first hub from being decoupled from an opening portion of the first drive plate.

14. The dry double clutch according to claim 1, wherein the resilient washer has an annular body which is inclined such that an inner periphery of the resilient washer further protrudes toward the engine than an outer periphery thereof, and the stopper ring is formed with a seating seat which is concavely recessed toward the transmission along an inner periphery of the stopper ring so as to seat the resilient washer.

15. The dry double clutch according to claim 14, wherein the outer periphery of the resilient washer is formed with a plurality of catching grooves which is circumferentially cut.

16. The dry double clutch according to claim 15, wherein the stopper ring is formed with one or more catching means which protrude from the seating seat so that the catching means are caught by the catching grooves of the resilient washer in order to prevent relative rotation of the resilient washer.

17. The dry double clutch according to claim 15, wherein the stopper ring is formed with one or more catching protrusions which protrude radially inwardly from a body thereof and are raised upward from the seating seat by a height difference between each of the catching protrusion and the seating seat, so that the catching protrusions are caught by the catching grooves of the resilient washer in order to prevent relative rotation of the resilient washer.

* * * * *